United States Patent
Ellavsky et al.

(10) Patent No.: US 8,448,121 B2
(45) Date of Patent: May 21, 2013

(54) IMPLEMENTING Z DIRECTIONAL MACRO PORT ASSIGNMENT

(75) Inventors: Matthew R. Ellavsky, Rochester, MN (US); Sean T. Evans, Rochester, MN (US); Timothy D. Helvey, Rochester, MN (US); Phillip P. Normand, Chippewa Falls, WI (US); Jason L. Van Vreede, Trempealeau, WI (US); Bradley C. White, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/208,046

(22) Filed: Aug. 11, 2011

(65) Prior Publication Data

US 2013/0042214 A1   Feb. 14, 2013

(51) Int. Cl.
*G06F 17/50* (2006.01)
(52) U.S. Cl.
USPC ............................ 716/126; 716/129; 716/130
(58) Field of Classification Search .................. 716/126, 716/129, 130
See application file for complete search history.

(56) References Cited

U.S. PATENT DOCUMENTS

| | | | |
|---|---|---|---|
| 6,360,350 B1 | 3/2002 | Gabele et al. | |
| 6,598,206 B2 | 7/2003 | Darden et al. | |
| 7,093,208 B2 | 8/2006 | Williams et al. | |
| 7,834,440 B2 | 11/2010 | Ito et al. | |
| 7,949,984 B2 | 5/2011 | Tanamoto et al. | |
| 2006/0168551 A1 | 7/2006 | Mukuno | |
| 2010/0219392 A1* | 9/2010 | Awaya et al. | 257/3 |
| 2011/0298134 A1* | 12/2011 | Williams et al. | 257/751 |

OTHER PUBLICATIONS

R. Berridge et al., "IBM POWER6 microprocessor physical design and design methodology," IBM J. Res & Dev., vol. 51, No. 6, Nov. 2007.
IBM TDB, "Virtual Random Logic Macro," IPCOM000193250D, Feb. 16, 2010.
R. Genz, "Placement of a Random Logic Macro in a CMPHLO Bit Stack," IBM TDB IPCOM000102724D, Jan. 1, 1990.
B. Stolt et al, "Design and Implementation of the POWER6 Microprocessor," IEEE Journal of Solid-State Circuits, vol. 43, No. 1, Jan. 2008, pp. 21-29.

\* cited by examiner

*Primary Examiner* — Vuthe Siek
(74) *Attorney, Agent, or Firm* — Joan Pennington

(57) ABSTRACT

A method, system and computer program product are provided for implementing an enhanced Z-directional macro port assignment or three-dimensional port creation for random logic macros of heterogeneous hierarchical integrated circuit chips. An initial port placement is provided on a layer for a macro. The initial port placement is expanded to provide a three-dimensional port shape including a plurality of metal layers along a z-axis. Wire routing of each of the macro level and a chip top level is defined within the expanded three-dimensional port shape. Each unnecessary metal layer of the expanded three-dimensional port shape is removed, providing a final three-dimensional port shape.

21 Claims, 13 Drawing Sheets

700

| | TOP LEVEL WIRING UTILIZATION | MACRO WIRING UTILIZATION |
|---|---|---|
| M9 | 100% | 100% |
| M8 | 90% | 90% |
| M7 | 90% | 65% |
| M6 | 85% | 80% |
| M5 | 85% | 85% |
| M4 | 75% | 85% |
| M3 | 50% | 90% |
| M2 | 80% | 95% |
| M1 | 100% | 100% |

|     | TOP LEVEL WIRING UTILIZATION | MACRO WIRING UTILIZATION |
|-----|------------------------------|--------------------------|
| M9  | 90%                          | 40%                      |
| M8  | 85%                          | 50%                      |
| M7  | 70%                          | 70%                      |
| M6  | 65%                          | 70%                      |
| M5  | 55%                          | 60%                      |
| M4  | 75%                          | 65%                      |
| M3  | 75%                          | 80%                      |
| M2  | 80%                          | 80%                      |
| M1  | 100%                         | 100%                     |

|     | TOP LEVEL WIRING UTILIZATION | MACRO WIRING UTILIZATION |
|-----|------------------------------|--------------------------|
| M9  | 100%                         | 80%                      |
| M8  | 90%                          | 80%                      |
| M7  | 70%                          | 65%                      |
| M6  | 85%                          | 60%                      |
| M5  | 85%                          | 55%                      |
| M4  | 75%                          | 75%                      |
| M3  | 80%                          | 90%                      |
| M2  | 80%                          | 90%                      |
| M1  | 100%                         | 100%                     |

FIG. 11

IMPLEMENTING Z DIRECTIONAL MACRO PORT ASSIGNMENT

FIELD OF THE INVENTION

The present invention relates generally to the data processing field, and more particularly, relates to a method, system and computer program product for implementing an enhanced Z-directional macro port assignment or three-dimensional port creation for random logic macros (RLMs) of heterogeneous hierarchical integrated circuit chips.

DESCRIPTION OF THE RELATED ART

Modern integrated circuits are created in a hierarchical manner. The entire chip is divided into mini-chips otherwise known as random logic macros (RLMs) or macros. Overall wire-ability is a known problem in many hierarchical ASIC designs.

The task of layout or physical design of integrated circuits including wiring of ports on an RLM boundary of heterogeneous hierarchical integrated circuit chips is time-consuming and a difficult task.

A need exists for an efficient and effective mechanism to implement port assignment for random logic macros (RLMs) of heterogeneous hierarchical integrated circuit chips.

SUMMARY OF THE INVENTION

Principal aspects of the present invention are to provide a method, system and computer program product for implementing an enhanced Z-directional macro port assignment or three-dimensional port creation for random logic macros (RLMs) of heterogeneous hierarchical integrated circuit chips. Other important aspects of the present invention are to provide such method, system, and computer program product substantially without negative effects and that overcome many of the disadvantages of prior art arrangements.

In brief, a method, system and computer program product are provided for implementing an enhanced Z-directional macro port assignment or three-dimensional port creation for random logic macros of heterogeneous hierarchical integrated circuit chips. An initial port placement is provided on a layer for a macro. The initial port placement is expanded to provide a three-dimensional port shape including a plurality of metal layers along a z-axis. Wire routing of each of the macro level and a chip top level is defined within the expanded three-dimensional port shape. Each unnecessary metal layer of the expanded three-dimensional port shape is removed, providing a final port shape.

In accordance with features of the invention, enhanced port wiring is enabled using a selected number of metal layers to wire to a port, where the initial shape of the port is not be constrained to a single layer. Advantages of using this technique are more efficient use of wiring congestion across multiple levels of hierarchy of heterogeneous hierarchical integrated circuit chips.

In accordance with features of the invention, wire routing of each of the macro level and the chip top level is defined within the expanded three-dimensional port shape enabling optimal port locations for each level of hierarchy based upon wiring density of each of the selected number of metal layers of each of the macro level and the chip top level.

In accordance with features of the invention, the initial port placement is provided on a layer for a macro using netlist port data including macro boundary physical placement data. This initial port location is then duplicated on every metal layer within a selected number of metal layers and this chimney of ports is connected with appropriate vias.

BRIEF DESCRIPTION OF THE DRAWINGS

The present invention together with the above and other objects and advantages may best be understood from the following detailed description of the preferred embodiments of the invention illustrated in the drawings, wherein:

FIG. 7 provides a wiring utilization example including a wiring density for each of the plurality of metal layers around the example port area of the chip top and the macro of FIG. 6 for implementing three-dimensional port creation in accordance with the preferred embodiment;

FIG. 10 provides another wiring utilization example including a wiring density for each of the plurality of metal layers around the example port area of the chip top and the macro of FIG. 6 for implementing three-dimensional port creation in accordance with the preferred embodiment;

FIG. 11 provides a wiring utilization example including a wiring density for each of the plurality of metal layers around the example port area of the chip top and the macro of FIG. 9 for implementing three-dimensional port creation in accordance with the preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing an enhanced Z-directional macro port assignment or three-dimensional port creation for random logic macros (RLMs) or macros of heterogeneous hierarchical integrated circuit chips. The invention provides enhanced metal layer flexibility for wiring ports on an RLM (Random Logic Macro) boundary. This is an improvement advantageously is used with any known RLM port assignment technique.

In accordance with features of the invention, the three-dimensional port creation method allows an RLM and top level of a design to use a plurality of layers to wire to a port, where the initial shape of the port is not be constrained to a single layer. The advantages include more efficient use of wiring congestion across multiple levels of hierarchy.

Figure 1:
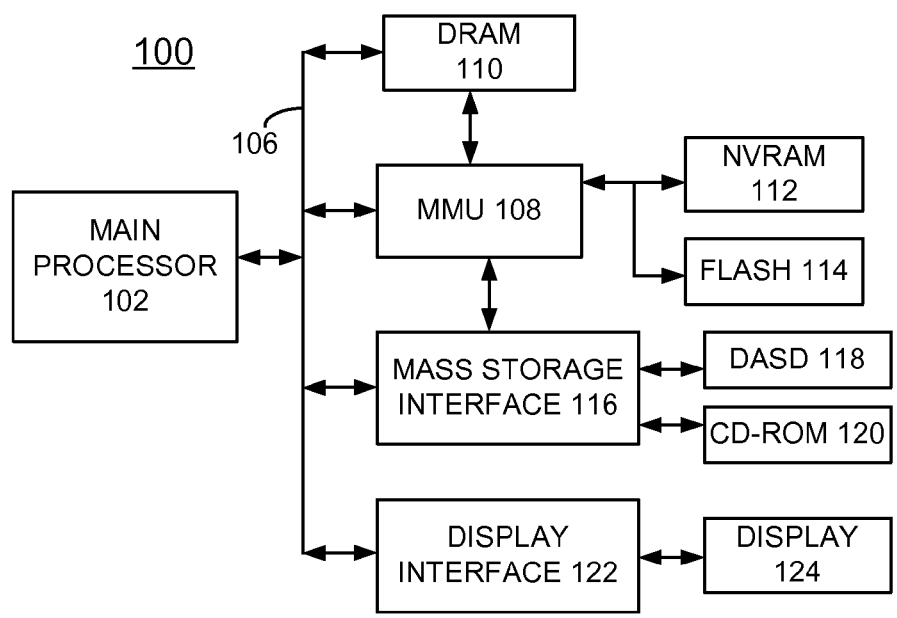
FIGS. 1 and 2 are block diagram representations illustrating an example computer system and operating system for implementing three-dimensional port assignment or creation of random logic macros (RLMs) of heterogeneous hierarchical integrated circuit chips in accordance with the preferred embodiment.
Figure 2:
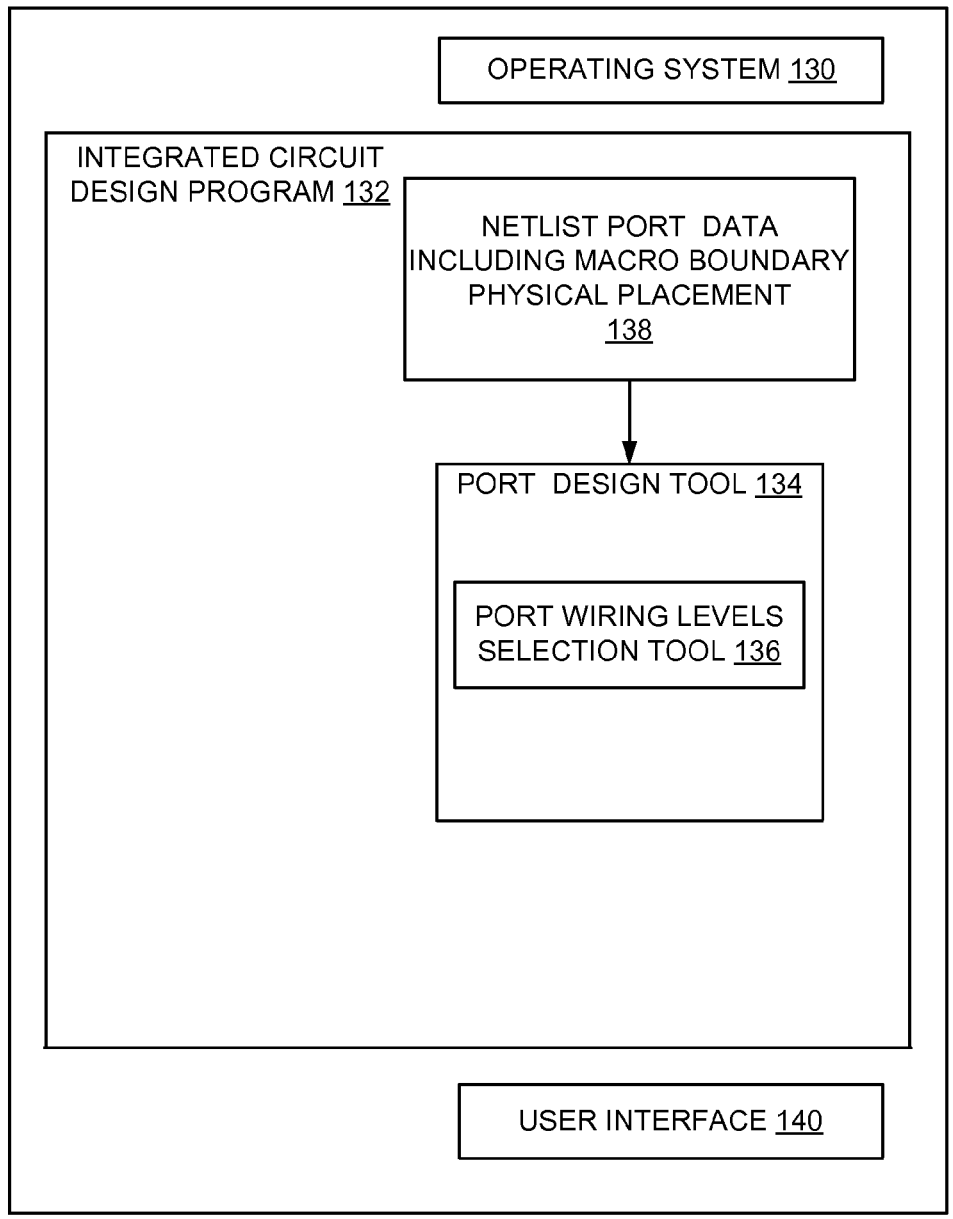

Referring now to the drawings, in FIGS. 1 and 2 there is shown a computer system generally designated by the reference character 100 for implementing three-dimensional port creation for a macro of heterogeneous hierarchical integrated circuit chips in accordance with the preferred embodiment. Computer system 100 includes a main processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer system 100 includes a display interface 122 coupled to the system bus 106 and connected to a display 124.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

As shown in FIG. 2, computer system 100 includes an operating system 130, an integrated circuit design program 132, a port design tool 134 and a port wiring levels selection tool 136 of the preferred embodiment, netlist data including physical placement data 138 describing physical placement of a macro boundary to be connected, and a user interface 140.

In accordance with features of the invention, the three-dimensional port creation method includes an initial port placement provided on a layer for a macro using the netlist port data including macro boundary physical placement data 138. This initial port placement is then duplicated on every metal layer within a selected number of metal layers extending the initial port placement to a three-dimensional (3D) port shape and this chimney of ports or 3D port shape is connected with appropriate vias.

Various commercially available computers can be used for computer system 100. CPU 102 is suitably programmed by the port design tool 134 and port wiring levels selection tool 136 to execute the flowchart of FIG. 3 for implementing three-dimensional port creation for a macro of heterogeneous hierarchical integrated circuit chips in accordance with the preferred embodiment.

Figure 3:
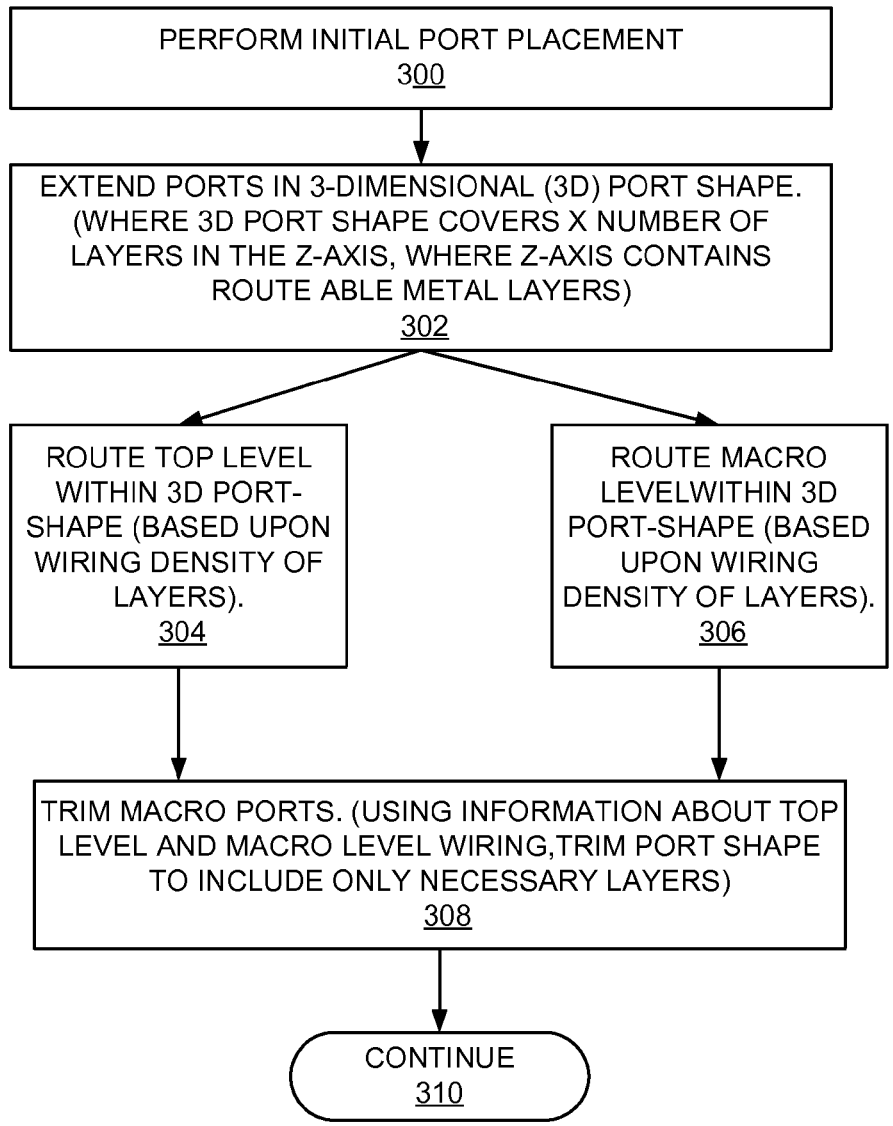
FIG. 3 is a flow chart illustrating example sequential steps for implementing three-dimensional port creation of a macro of heterogeneous hierarchical integrated circuit chips in accordance with the preferred embodiment.

Referring now to FIG. 3, there are shown exemplary sequential steps for implementing three-dimensional port creation for a macro of heterogeneous hierarchical integrated circuit chips in accordance with the preferred embodiment. As indicated at a block an initial port placement is performed or provided as indicated at a block 300. Each port is extended in three-dimensional (3D) port shape as indicated at a block 302, where the initial port covers a set number of metal layers in the Z-axis, where the Z-axis contains route-able metal layers. Wire routing is defined for each of the top level and the macro level within the expanded 3D port shape based upon respective wiring densities of the set number of metal layers for the as indicated at respective blocks 304, 306. As indicated at a block 308, each of the macro ports is trimmed using information about the wiring of both the top level and macro level, with the port shape trimmed to include only required necessary layers with unnecessary ports and vias are removed. The operations continue as indicated at a block 310.

Figure 4:
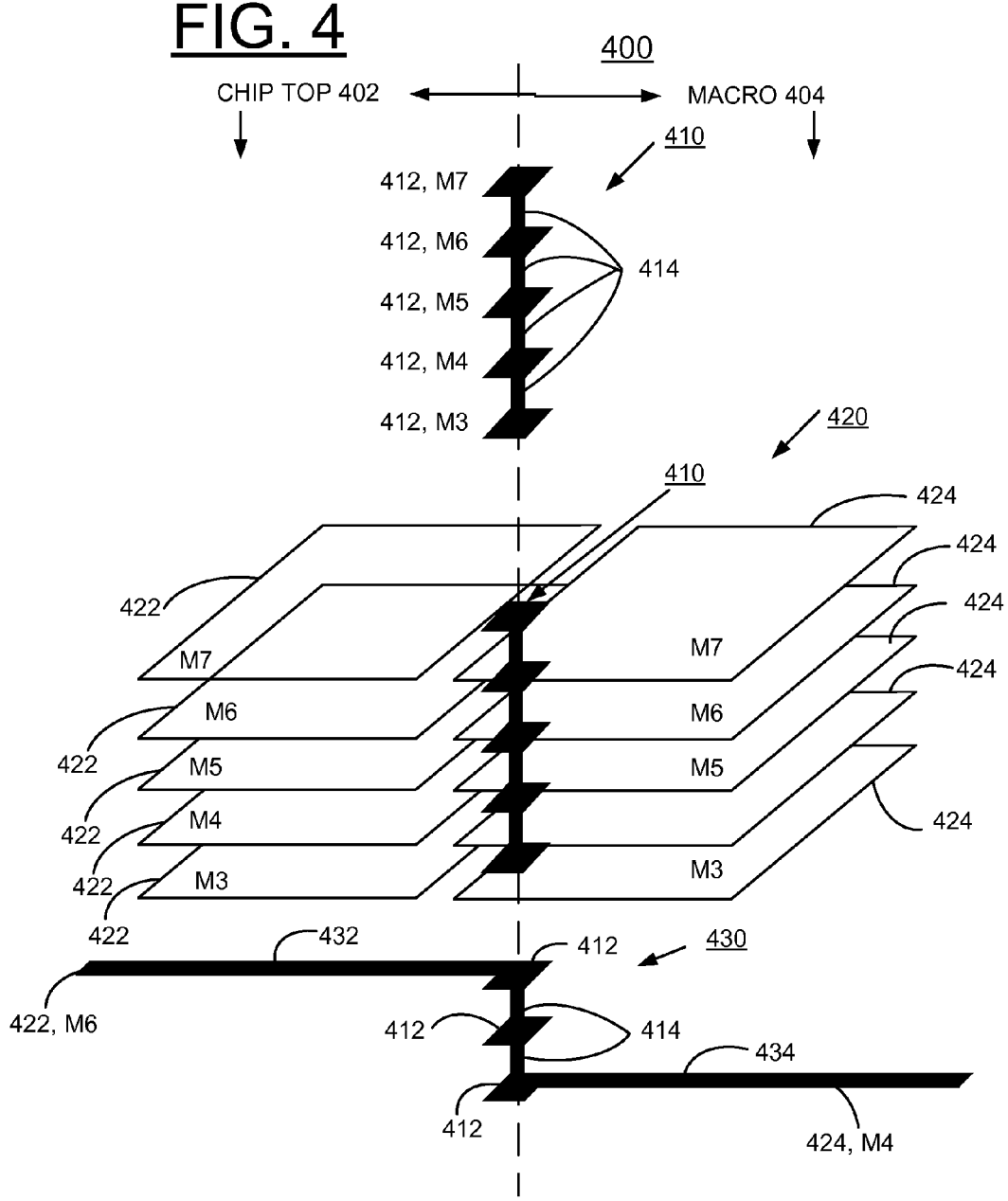
FIG. 4 schematically illustrates not to scale example sequential steps for implementing three-dimensional port creation in accordance with the preferred embodiment of an integrated circuit chip including an example chip top and an example macro.

Referring also to FIG. 4 there are shown example sequential steps for an example integrated circuit chip generally designated by the reference character 400 for implementing three-dimensional port creation in accordance with the preferred embodiment illustrating a chip top generally designated by the reference character 402 and an example macro generally designated by the reference character 404. An initial three-dimensional (3D) port shape generally indicated by 410 is defined including a plurality of ports 412 M3-M7 on both the chip top and the macro 404 together with a plurality of metal vias 414 connecting the respective ports 412. Next generally indicated by 420, an identified wiring congestion or wiring density of each of a plurality of respective metal layers 422, 424, M3-M7 on the chip top and the macro 404 around the initial 3D port shape 410 is used for defining wire routing on respective ones of the metal layers 422, 424, M3-M7 of the chip top and the macro 404. A final 3D port shape generally indicated by 430 is defined including a pair of required metal vias 414 connected three ports 412 between a wiring level 432 on a selected metal layer 422, such as metal layer 422, M6 of the chip top and a wiring level 434 on a selected metal layer 424, such as metal layer 424, M4 of the macro 404, as shown.

Referring now to FIGS. 5-12 there is shown an example integrated circuit chip generally designated by the reference character 500 for implementing three-dimensional port creation in accordance with the preferred embodiment.

Figure 5:
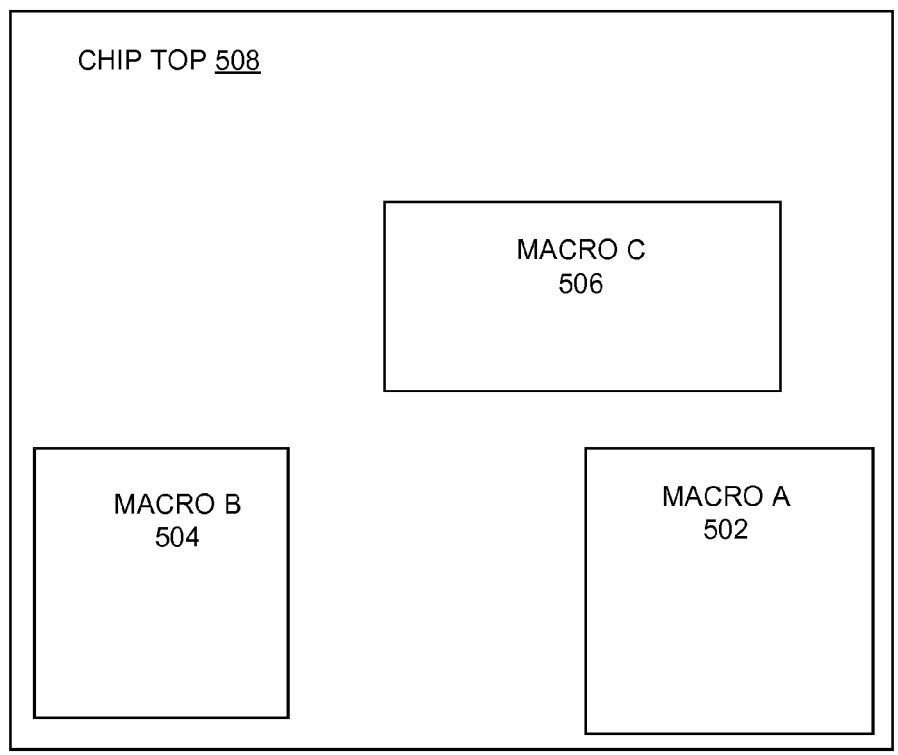
FIG. 5 schematically illustrates not to scale an example integrated circuit chip including a chip top together with three example RLM or macros for implementing three-dimensional port creation in accordance with the preferred embodiment.

FIG. 5 schematically illustrates not to scale a plurality of example RLM or macros generally designated by the reference character A, 502, B, 504, and C, 506 and an example chip top generally designated by the reference character 508 for implementing three-dimensional port creation in accordance with the preferred embodiment.

Figure 6:
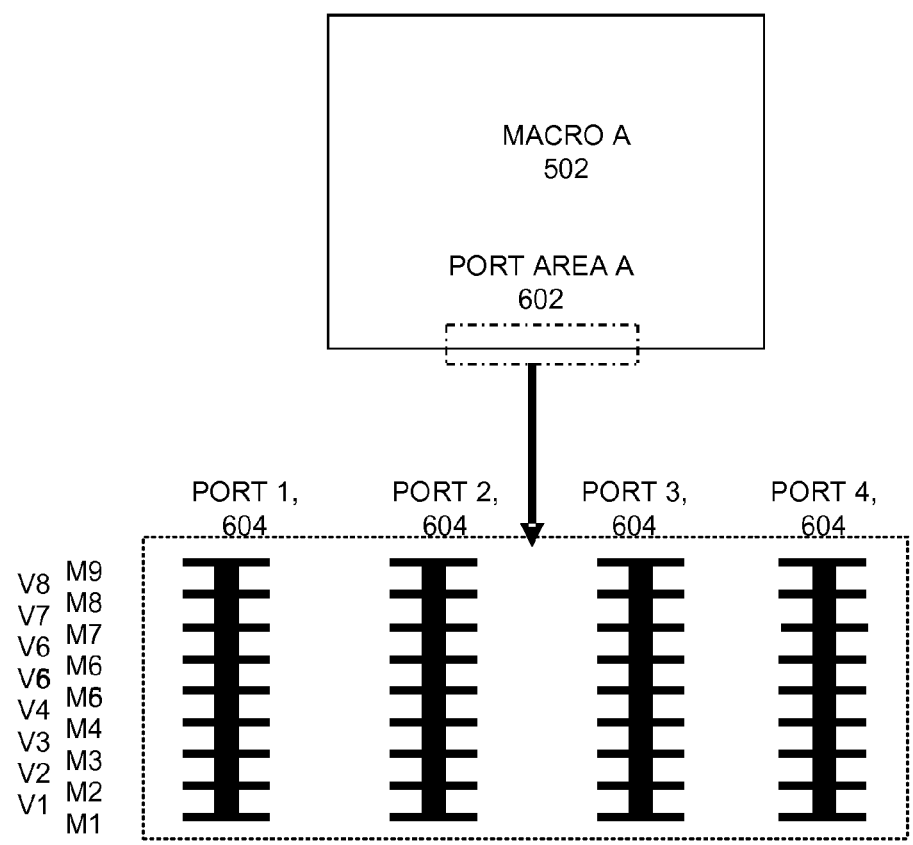
FIG. 6 schematically illustrates not to scale an example port area and a plurality of ports of one of the three example RLM or macros of FIG. 5 for implementing three-dimensional port creation in accordance with the preferred embodiment.

FIG. 6 schematically illustrates not to scale an example port area A, 602, and a plurality of ports 1-4, 604 of the macro A, 502 of FIG. 5 for implementing three-dimensional port creation in accordance with the preferred embodiment. Each of the plurality of ports 1-4, 604 includes a plurality of metal layers M1-M9 on the chip top 508 and the macro A, 502 connected by a plurality of respective metal vias V1-V8.

FIG. 7 provides a wiring utilization example generally designated by the reference character 700 including a wiring density for each of the plurality of metal layers M1-M9 on the chip top 508 and the macro A, 502 around the example port area 602 of for implementing three-dimensional port creation in accordance with the preferred embodiment. As shown, metal layer M7 around the example port area A, 602 of the macro A, 502 includes a macro wiring utilization of 65% and metal layer M3 around the example port area 602 of the chip top 508 includes a top level wiring utilization of 50%, with the remaining other metal layers having higher wiring utilization values.

Figure 8:
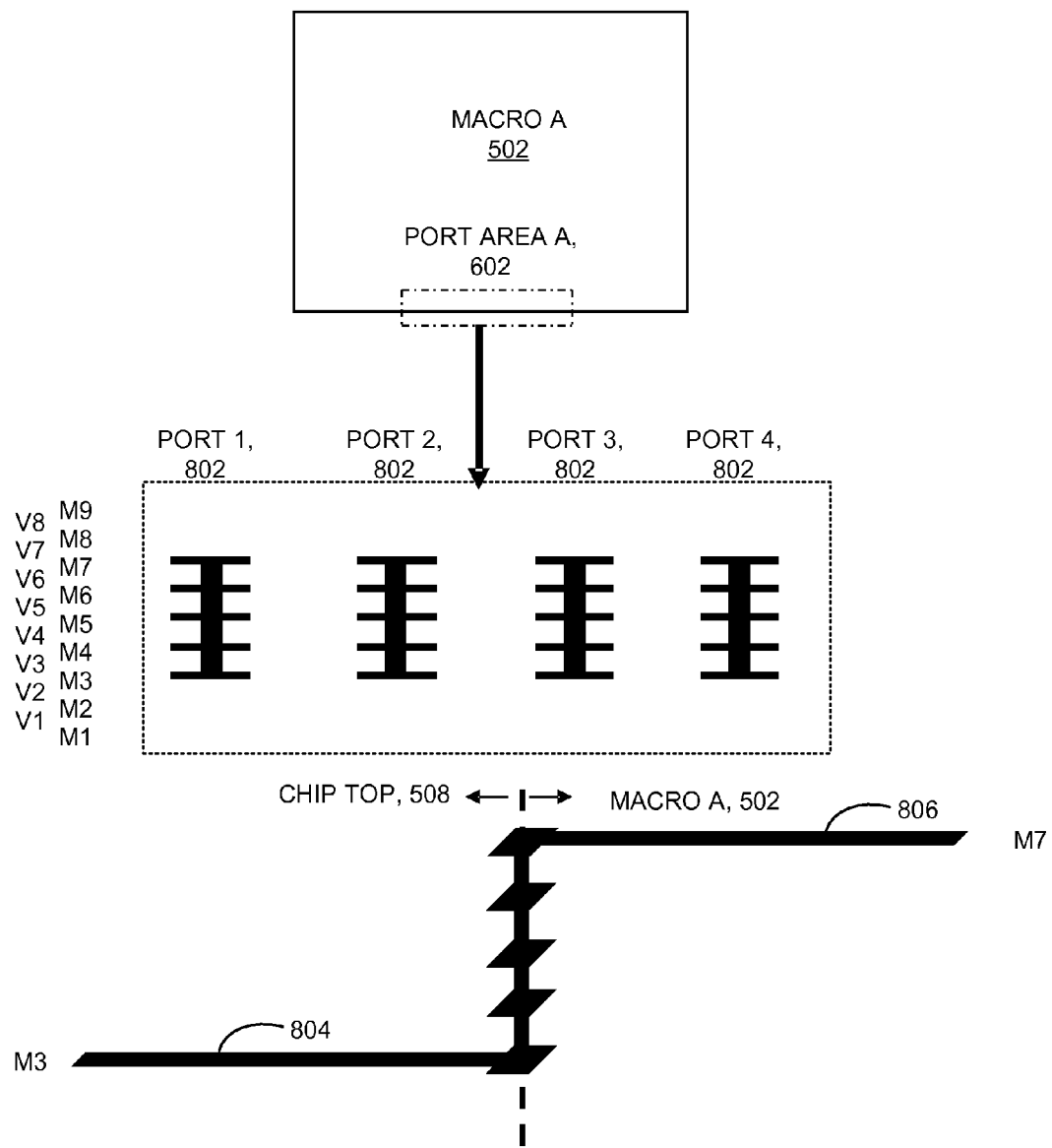
FIG. 8 schematically illustrates not to scale example final port shape of the example port area of the chip top and the macro of FIG. 6 based upon the example wiring utilization of FIG. 7 for implementing three-dimensional port creation in accordance with the preferred embodiment.

FIG. 8 schematically illustrates not to scale an example final port shape including metal layers M3-M7 of the chip top 508 and the macro A, 502 together with respective connecting metal vias V3-V6 for the example port area A, 602 of FIG. 6 based upon the wiring utilization example 700 for implementing three-dimensional port creation in accordance with the preferred embodiment. A wiring level 804 on a selected metal layer M3 of the chip top 508 and a wiring level 806 on a selected metal layer M7 of the macro A, 502 are provided, as shown.

Figure 9:
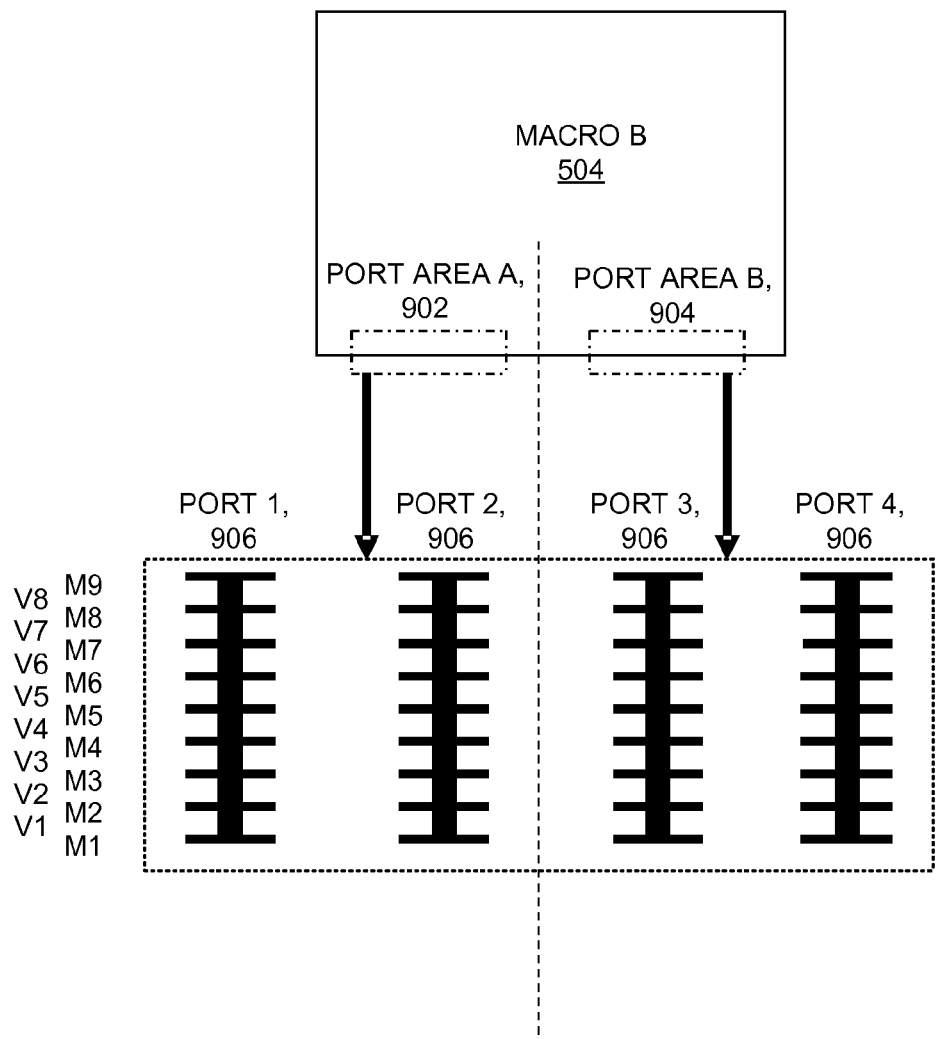
FIG. 9 schematically illustrates not to scale another example port area and a plurality of ports of another one of the three example RLM or macros of FIG. 5 for implementing three-dimensional port creation in accordance with the preferred embodiment.

FIG. 9 schematically illustrates not to scale another example including a port area A, 902, and a port area B, 904 and a plurality of respective ports 1-4, 906 of the example RLM or macro B, 504 of FIG. 5 for implementing three-dimensional port creation in accordance with the preferred embodiment. Each of the plurality of ports 1-4, 906 includes a plurality of metal layers M1-M9 on the chip top 508 and the macro A, 502 connected by a plurality of respective metal vias V1-V8.

FIG. 10 provides a wiring utilization example generally designated by the reference character 1000 including a wiring density for each of the plurality of metal layers around the example port area A, 902 of the chip top 508 and the macro B, 504 of FIG. 9 for implementing three-dimensional port creation in accordance with the preferred embodiment. As shown, metal layer M9 around the example port area A, 902 of the macro B, 504 includes a macro wiring utilization of 40% and metal layer M5 around the example port area A, 902 of the chip top 508 includes a top level wiring utilization of 55%, with the remaining other metal layers having higher wiring utilization values.

FIG. 11 provides a wiring utilization example generally designated by the reference character 1100 including a wiring density for each of the plurality of metal layers around the example port area B, 904 of the chip top 508 and the macro B, 504 of FIG. 9 for implementing three-dimensional port creation in accordance with the preferred embodiment. As shown, metal layer M7 around the example port area B, 904 of the macro B, 504 includes a macro wiring utilization of 70% and metal layer M5 around the example port area B, 904 of the chip top 508 includes a top level wiring utilization of 55%, with the remaining other metal layers having higher wiring utilization values.

Figure 12:
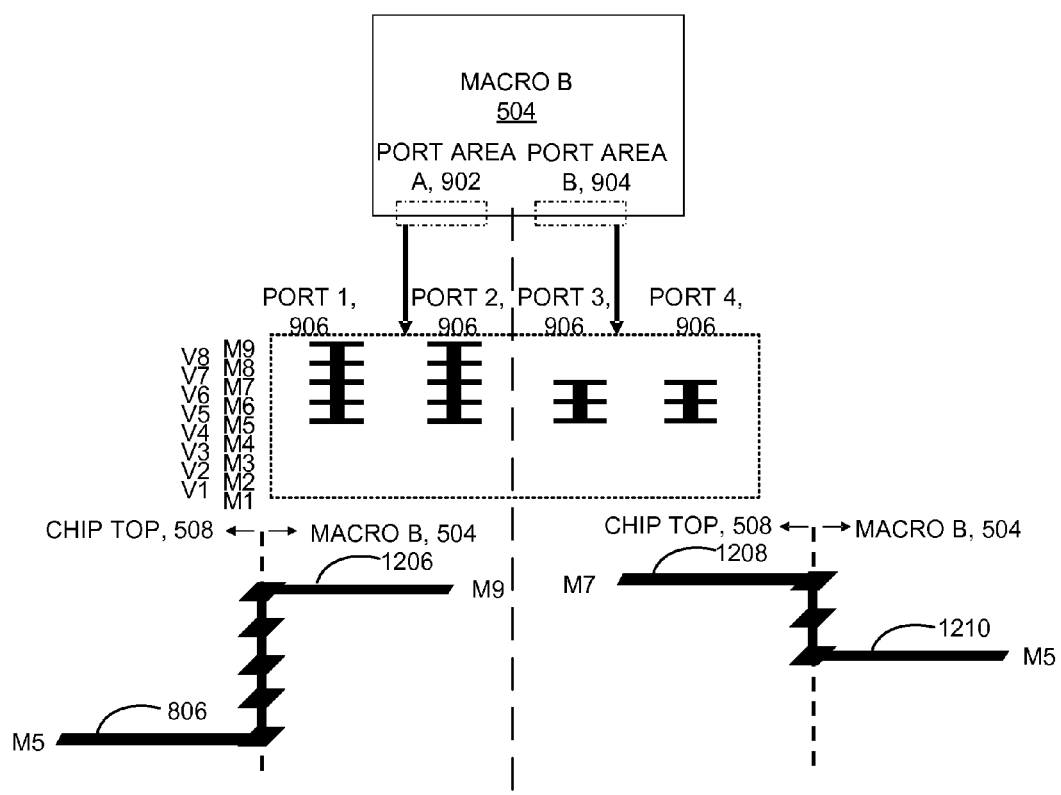
FIG. 12 schematically illustrates not to scale example final port shape of multiple port areas including the example port area of the chip top and the macro of FIG. 6 based upon the example wiring utilization of FIG. 10 and the example port area of the chip top and the macro of FIG. 9 based upon the example wiring utilization of FIG. 11 for implementing three-dimensional port creation in accordance with the preferred embodiment.

FIG. 12 schematically illustrates not to scale example final port shapes of multiple port areas including the port area A, 902, and the port area B, 904 including the example port area A and port area B of the chip top 508 and the macro B, 504 based upon the example wiring utilization 1000 of FIG. 10 and the example wiring utilization 1100 of FIG. 11 for implementing three-dimensional port creation in accordance with the preferred embodiment.

In FIG. 12, a first example final port shape including metal layers M5-M9 of the chip top 508 and the macro B, 504 together with respective connecting metal vias V5-V8 for the example port area A, 902 based upon the wiring utilization example 1000 for implementing three-dimensional port creation in accordance with the preferred embodiment. A wiring level 1204 on a selected metal layer M5 of the chip top 508 and a wiring level 1206 on a selected metal layer M9 of the macro B, 504 are provided for ports 1-2, 906 as shown.

In FIG. 12, a second example final port shape including metal layers M5-M7 of the chip top 508 and the macro B, 504 together with respective connecting metal vias V5-V6 for the example port area B, 904 based upon the wiring utilization example 1100 for implementing three-dimensional port creation in accordance with the preferred embodiment. A wiring level 1208 on a selected metal layer M7 of the chip top 508 and a wiring level 1210 on a selected metal layer M5 of the macro B, 504 are provided for ports 3-4, 906 as shown.

Figure 13:
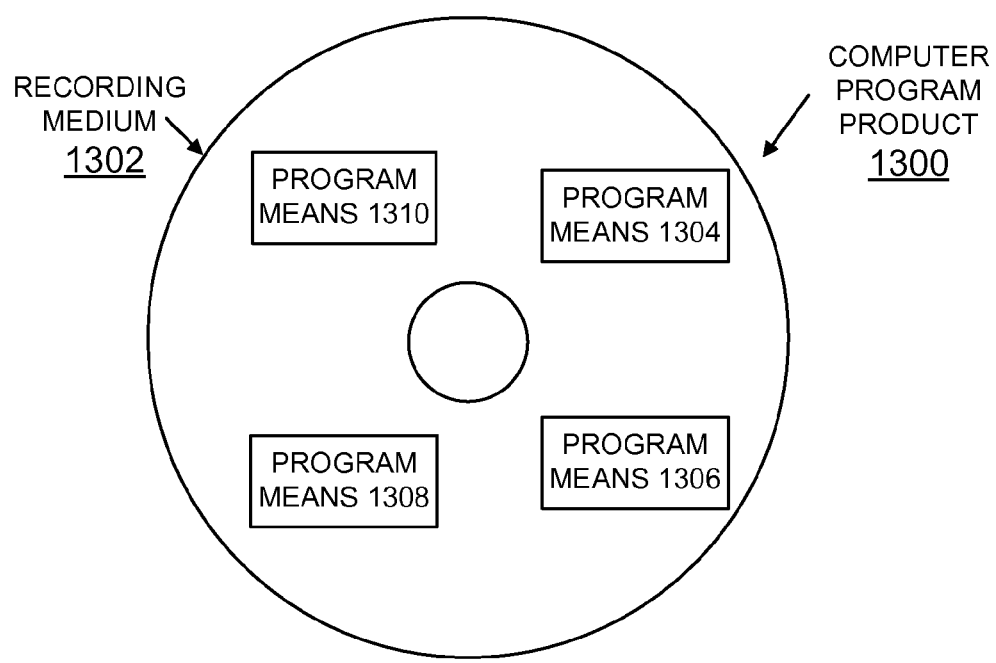
FIG. 13 is a block diagram illustrating a computer program product in accordance with the preferred embodiment.

Referring now to FIG. 13, an article of manufacture or a computer program product 1300 of the invention is illustrated. The computer program product 1300 includes a recording medium 1302, such as, a floppy disk, a high capacity read only memory in the form of an optically read compact disk or CD-ROM, a tape, or another similar computer program product. Recording medium 1302 stores program means 1304, 1306, 1308, 1310 on the medium 1302 for carrying out the methods for implementing three-dimensional port creation of random logic macros (RLMs) of heterogeneous hierarchical integrated circuit chips of the preferred embodiment in the system 100 of FIGS. 1 and 2.

A sequence of program instructions or a logical assembly of one or more interrelated modules defined by the recorded program means 1304, 1306, 1308, 1310, direct the computer system 100 for implementing three-dimensional port creation of random logic macros (RLMs) of heterogeneous hierarchical integrated circuit chips of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for implementing three-dimensional port creation for heterogeneous hierarchical integrated circuit chips comprising:
   using a computer, identifying an initial port placement for a macro;
   using a computer, extending a port shape of said initial port placement into a three-dimensional shape including a set number of metal layers;
   using a computer, defining wire routing for a chip top level and a macro level of the extended three-dimensional port shape; and
   using a computer, trimming said extended three-dimensional port shape to include selected metal layers responsive to defining wire routing for the chip top level and the macro level.

2. The computer-implemented method as recited in claim 1 includes enabling enhanced port wiring using said set number of metal layers to wire to a port based upon wiring density of each of said set number of metal layers.

3. The computer-implemented method as recited in claim 1 wherein using a computer, defining wire routing for a chip top level and a macro level of the extended three-dimensional port shape includes using said number of metal layers and defining wire routing on a selected metal layer for said chip top level based upon wiring density of each of said set number of metal layers for said chip top level proximate to said port placement.

4. The computer-implemented method as recited in claim 3 includes using said number of metal layers and defining wire routing on a selected metal layer for said macro level based upon wiring density of each of said set number of metal layers for said macro level proximate to said port placement.

5. The computer-implemented method as recited in claim 1 wherein using a computer, identifying an initial port placement for a macro includes using netlist port data including macro boundary physical placement data.

6. The computer-implemented method as recited in claim 1 wherein using a computer, extending a port shape into a three-dimensional shape including a set number of metal layers includes duplicating said port shape of said initial port placement on each of said set number of metal layers and connecting said duplicated port shapes with respective interconnecting metal vias.

7. The computer-implemented method as recited in claim 6 wherein using a computer, trimming the extended three-dimensional port shape to include selected metal layers responsive to defining wire routing for the chip top level and the macro level includes removing each unnecessary layer of said set number of metal layers and removing each unnecessary interconnecting metal via of the extended three-dimensional port shape.

8. A system for implementing three-dimensional port creation for heterogeneous hierarchical integrated circuit chips comprising:
 a processor,
 an integrated circuit design program tangibly embodied in a machine readable medium used in the integrated circuit design process, said integrated circuit design program including a port design tool and a port plane selection tool;
 said processor using said port design tool, identifying an initial placement for a port for a macro; extending a port shape of said initial port placement in three-dimensional shape including a set number of metal layers;
 said processor using said port design tool and said port plane selection tool, defining wire routing for a chip top level and a macro level of the extended three-dimensional port shape; and trimming the extended three-dimensional port shape to include only selected metal layers responsive to defining wire routing for the chip top level and the macro level.

9. The system as recited in claim 8 wherein said processor enables enhanced port wiring using said set number of metal layers to wire to a port based upon wiring density of each of said set number of metal layers.

10. The system as recited in claim 8 wherein said processor defining wire routing for a chip top level and a macro level of the extended three-dimensional port shape includes said processor using said number of metal layers and defining wire routing on a selected metal layer for said chip top level based upon wiring density of each of said set number of metal layers for said chip top level proximate to said port placement.

11. The system as recited in claim 10 includes said processor using said number of metal layers and defining wire routing on a selected metal layer for said macro level based upon wiring density of each of said set number of metal layers for said macro level proximate to said port placement.

12. The system as recited in claim 8 wherein said processor identifying an initial placement for a port for a macro includes said processor using netlist port data including macro boundary physical placement data.

13. The system as recited in claim 8 wherein said processor extending a port shape into a three-dimensional shape including a set number of metal layers includes said processor duplicating said port shape of said initial port placement on each of said set number of metal layers and connecting said duplicated port shapes with respective interconnecting metal vias.

14. The system as recited in claim 8 wherein said processor trimming the extended three-dimensional port shape to include selected metal layers responsive to defining wire routing for the chip top level and the macro level includes said processor removing each unnecessary layer of said set number of metal layers and removing each unnecessary interconnecting metal via.

15. An integrated circuit design computer program product for implementing three-dimensional port creation on a hierarchical design on an integrated circuit chip in a computer system, said computer program product tangibly embodied in a non-transitory machine readable medium used in the integrated circuit design process, said integrated circuit design computer program product including a port design tool and a port plane selection tool, said integrated circuit design computer program product including instructions executed by the computer system to cause the computer system to perform the steps of:
 identifying an initial port placement for a macro;
 extending a port shape of said initial port placement into a three-dimensional shape including a set number of metal layers;
 defining wire routing for a chip top level and a macro level of the extended three-dimensional port shape; and
 trimming said extended three-dimensional port shape to include selected metal layers responsive to defining wire routing for the chip top level and the macro level.

16. The integrated circuit design computer program product as recited in claim 15 includes enabling enhanced port wiring using said set number of metal layers to wire to a port based upon wiring density of each of said set number of metal layers.

17. The integrated circuit design computer program product as recited in claim 15 wherein defining wire routing for a chip top level and a macro level of the extended three-dimensional port shape includes using said number of metal layers and defining wire routing on a selected metal layer for said chip top level based upon wiring density of each of said set number of metal layers for said chip top level proximate to said port placement.

18. The integrated circuit design computer program product as recited in claim 17 includes using said number of metal layers and defining wire routing on a selected metal layer for said macro level based upon wiring density of each of said set number of metal layers for said macro level proximate to said port placement.

19. The integrated circuit design computer program product as recited in claim 15 wherein identifying an initial placement for a port for a macro includes using netlist port data including macro boundary physical placement data.

20. The integrated circuit design computer program product as recited in claim 15 wherein extending a port shape into a three-dimensional shape including a set number of metal layers includes duplicating said port shape of said initial port placement on each of said set number of metal layers and connecting said duplicated port shapes with respective interconnecting metal vias.

21. The integrated circuit design computer program product as recited in claim 15 wherein trimming the extended three-dimensional port shape to include selected metal layers responsive to defining wire routing for the chip top level and the macro level includes removing each unnecessary layer of said set number of metal layers and removing each unnecessary interconnecting metal via of the extended three-dimensional port shape.

* * * * *